United States Patent
Itou

(10) Patent No.: US 8,272,415 B2
(45) Date of Patent: Sep. 25, 2012

(54) HEAVY DUTY TIRE

(75) Inventor: Kuniaki Itou, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1183 days.

(21) Appl. No.: 12/084,406

(22) PCT Filed: Dec. 13, 2006

(86) PCT No.: PCT/JP2006/324797
§ 371 (c)(1),
(2), (4) Date: Apr. 30, 2008

(87) PCT Pub. No.: WO2007/072717
PCT Pub. Date: Jun. 28, 2007

(65) Prior Publication Data
US 2009/0090445 A1    Apr. 9, 2009

(30) Foreign Application Priority Data
Dec. 20, 2005   (JP) ................. 2005-366876

(51) Int. Cl.
*B60C 11/12*    (2006.01)
*B60C 11/13*    (2006.01)
(52) U.S. Cl. .......... 152/209.21; 152/209.22; 152/DIG. 3
(58) Field of Classification Search ............ 152/209.21, 152/209.22, DIG. 3
See application file for complete search history.

(56) References Cited

U.S. PATENT DOCUMENTS

| | | | | |
|---|---|---|---|---|
| 4,217,942 A * | 8/1980 | Takigawa et al. | ........ | 152/209.21 |
| 4,223,712 A * | 9/1980 | Iwata et al. | ............... | 152/209.22 |
| 4,649,975 A * | 3/1987 | Kogure et al. | ........... | 152/DIG. 3 |
| 5,909,756 A | 6/1999 | Miyazaki | | |
| 6,382,283 B1 * | 5/2002 | Caretta | .................... | 152/DIG. 3 |
| 6,481,480 B1 | 11/2002 | Schuster et al. | | |
| 2005/0211354 A1 | 9/2005 | Shinmura et al. | | |

FOREIGN PATENT DOCUMENTS

| | | | |
|---|---|---|---|
| EP | 965464 A2 * | 12/1999 | |
| JP | 5-178031 A | 7/1993 | |
| JP | 7-172112 A | 7/1995 | |
| JP | 07-172112 A * | 7/1995 | |

(Continued)

OTHER PUBLICATIONS

Machine translation for Japan 2005-289122 (no date).*

(Continued)

*Primary Examiner* — Steven D Maki
(74) *Attorney, Agent, or Firm* — Birch, Stewart, Kolasch & Birch, LLP

(57) ABSTRACT

A heavy duty tire (1) comprising at least three rib-like land portions (7) with a block row where blocks (6) defined by circumferential main grooves (3) extending in the circumferential direction and lateral grooves (5) are arranged in the circumferential direction, wherein the lateral grooves (5) are provided, in their bottoms (S), with a sipe-forming region (Sy) having a sipe (20) which extends along the groove center line and has a width of 0.5 to 2.0 mm, and wherein the depth (DY) in the sipe-forming region (Sy) of the lateral grooves (5) is from 0.5 to 0.75 times the depth (H) of the circumferential main grooves (3), and the depth (DS) of the sipe (20) is from 0.75 to 1.0 times the depth (H) of the circumferential main grooves.

9 Claims, 6 Drawing Sheets

FOREIGN PATENT DOCUMENTS

| | | | |
|---|---|---|---|
| JP | 8-282213 A | | 10/1996 |
| JP | 9-188110 A | | 7/1997 |
| JP | 10-86613 A | | 4/1998 |
| JP | 2000-168317 A | * | 6/2000 |
| JP | 2000-511847 A | | 9/2000 |
| JP | 2001-187517 A | * | 7/2001 |
| JP | 2004-161202 A | | 6/2004 |
| JP | 2004-203269 A | | 7/2004 |
| JP | 2004-217120 A | | 8/2004 |
| JP | 2005-271792 A | | 10/2005 |
| JP | 2005-289122 A | * | 10/2005 |

OTHER PUBLICATIONS

Machine translation for Japan 2001-187517 (no date).*
Machine translation for Japan 2000-168317 (no date).*
Machine translation for Japan 07-172112 (no date).*

* cited by examiner

HEAVY DUTY TIRE

TECHNICAL FIELD

The present invention relates to a heavy duty tire with suppressed heel and toe wear.

BACKGROUND ART

A high traction performance is particularly important for a heavy duty tire to be mounted on a driving shaft side of a vehicle. For this purpose has been adopted a block pattern that the tread surface is divided into a plurality of rows of blocks by circumferential main grooves extending in the circumferential direction of tire and lateral grooves extending in a direction intersecting the circumferential grooves.

DISCLOSURE OF THE INVENTION

Problem to be Solved by the Invention

This block pattern has an excellent traction performance, but owing to running, there occurs a so-called heel and toe wear that an edge portion on the late-ground-contacting side (i.e., heel portion) of a block is worn away faster than an edge portion on the first-ground-contacting side (i.e., toe portion) of the block. Therefore, in order to simultaneously achieve both the traction performance and the heel and toe wear resistance, various proposals have been made. For example, it is proposed to decrease the depth of lateral grooves, to increase the depth of lateral grooves, to form tie-bars in lateral grooves, or to form sipes in lateral grooves. However, satisfactory results have not been obtained.

Accordingly, it is an object of the present invention to provide a heavy duty tire which can reduce the heel and toe wear while securing an excellent traction performance on the basis that sipes are formed in the bottom of lateral grooves and, furthermore, there are regulated the ratio of the depth of the lateral grooves to the depth of a circumferential main groove and the ratio of the depth of the sipes to the depth of a circumferential main groove.

Patent Literature 1: JP-A-5-178031
Patent Literature 2: JP-A-2004-217120

Means to Solve the Invention

The present invention as claimed in claim 1 is directed to a heavy duty tire having a plurality of circumferential main grooves extending in the circumferential direction in the tread surface of a tread portion to provide rib-like land portions between the adjacent circumferential main grooves and between tread edges and the circumferential main grooves, wherein at least three of the rib-like land portions have a row of blocks arranged in the circumferential direction by providing lateral grooves crossing each rib-like land portion, and wherein each lateral groove is provided in its bottom with a sipe-forming region having a sipe which extends along the groove center line of the lateral groove and has a width of 0.5 to 2.0 mm, the depth DY from the tread surface of the lateral groove in the sipe-forming region is from 0.5 to 0.75 times the depth H from the tread surface of the circumferential main grooves that intersect with the lateral groove, and the depth DS from the tread surface of the sipe is from 0.75 to 1.0 times the depth H of the circumferential main grooves.

EFFECTS OF THE INVENTION

Since the present invention is constructed as mentioned above, the heel and toe wear can be reduced with securing an excellent traction performance for the reasons mentioned after.

| Explanation of Symbols | |
|---|---|
| 2. | Tread portion |
| 2S | Tread surface |
| 3, 3i, 3o | Circumferential main groove |
| 4, 4c, 4m, 4o | Rib-like land portion |
| 5, 5c, 5m | Lateral groove |
| 6, 6c, 6m | Block |
| 7, 7c, 7m | Rib-like land portion with block row |
| 13 | Narrow part |
| 14 | Projecting part |
| 20, 20c, 20m | Sipe |
| 21A | First arc portion |
| 21B | Second arc portion |
| 22 | Arc portion |
| 40 | Step groove |
| 40a | Deep portion |
| 40b | Shallow portion |
| C | Tire equator |
| S | Groove bottom |
| Sy | Sipe-forming region |
| Te | Tread edge |

BEST MODE FOR CARRYING OUT THE INVENTION

Figure 1:
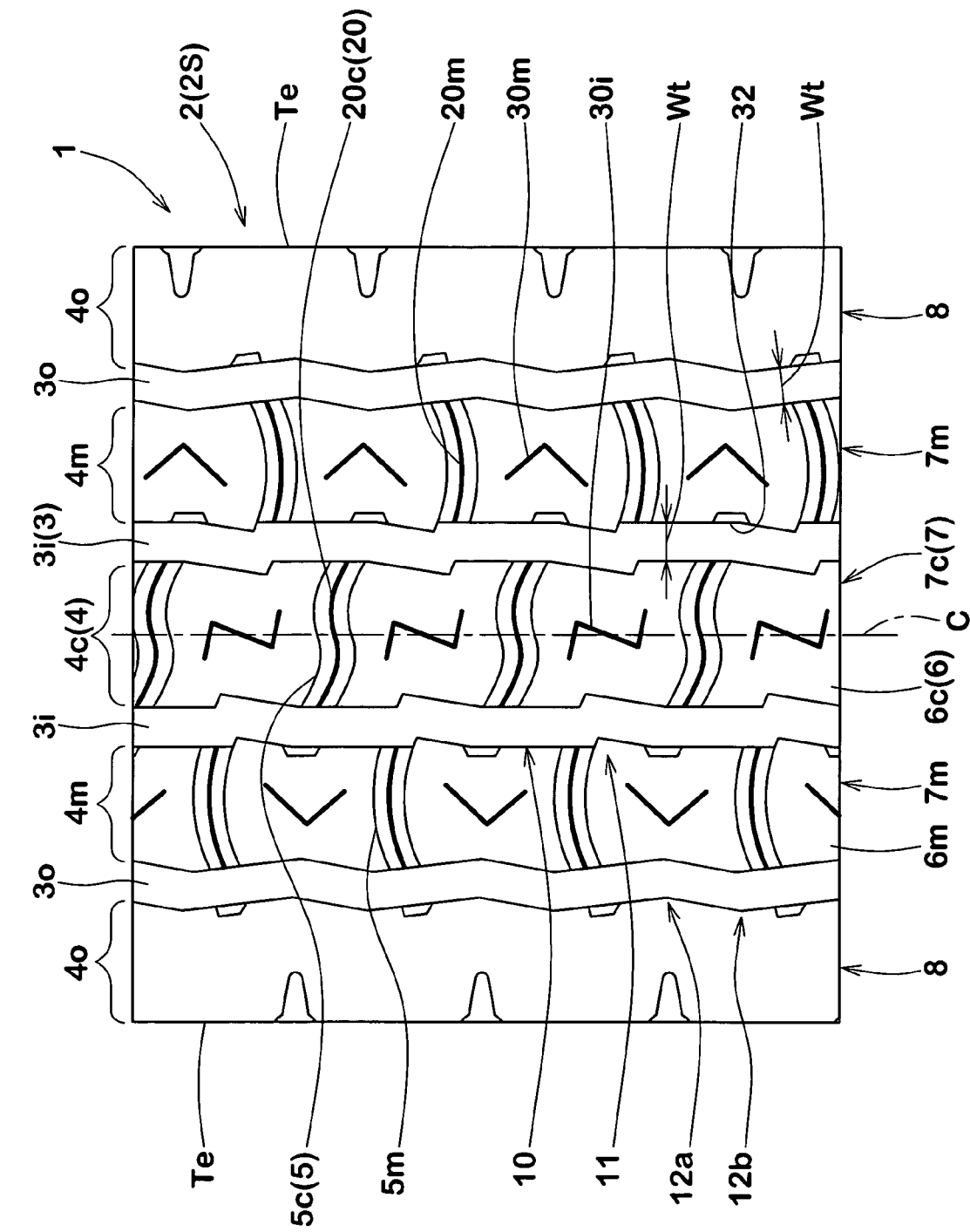
FIG. 1 is a development view showing a developed tread surface of a heavy duty tire according to the present invention.

An embodiment of the present invention will now be explained with reference to the accompanying drawings wherein FIG. 1 is a development view showing a developed tread surface of a heavy duty tire according to the present invention.

As shown in FIG. 1, a heavy duty tire 1 is provided in a tread surface 2S of a tread portion 2 with a plurality of circumferential main grooves 3 extending in the circumferential direction of the tire, whereby rib-like land portions 4 are formed between the circumferential main grooves 3, 3 and between a tread edge Te and the circumferential main groove 3. The rib-like land portions 4 include at least three rib-like land portions 7 with a block row in which blocks 6 defined by lateral grooves 5 crossing the rib-like land portion 4 are arranged in the circumferential direction of tire.

In the present embodiment, the circumferential main grooves 3 are composed of four grooves, i.e., inner circumferential main grooves 3*i* disposed on the both sides of the tire equator C, and outer circumferential main grooves 3*o* disposed outward of the inner grooves 3*i*. The tread surface 2S is divided by these circumferential grooves 3 into five rib-like land portions, i.e., a center rib-like land portion 4*c* located between the inner circumferential main grooves 3*i*, 3*i*, middle rib-like land portions 4*m* located between the inner and outer circumferential main grooves 3*i*, 3*o*, and outer rib-like land portions 4*o* located outward of the outer circumferential main grooves 3*o*.

Of these land portions, the center rib-like land portion 4*c* is formed as a rib-like land portion 7*c* with a center block row in which center blocks 6*c* defined by center lateral grooves 5*c* crossing the rib-like land portion 4*c* are arranged in the circumferential direction. Also, the middle rib-like land portions 4*m* are formed as rib-like land portions 7*m* with a center block row in which middle blocks 6*m* defined by middle lateral grooves 5*m* crossing the rib-like land portion 4*m* are arranged in the circumferential direction. Further, the outer rib-like land portions 4*o* are formed as ribs 8 extending continuously in the circumferential direction. In some cases, the rib-like land portions 7*m* with a middle block row may be called rib-like land portions 7*m* with a side block row in contrast to the rib-like land portion 7*c* with a center block row. Also, for convenience sake, the rib-like land portion 7 with a block row, the rib-like land portion 7*c* with a center block row, and the rib-like land portion 7*m* with a middle block row (or a side block row) may be called simply a block row 7, a center block row 7*c*, and a middle block row 7*m* (or a side block row 7*m*), respectively.

As to the groove width Wt on the tread surface 2S and the groove depth H (shown in FIG. 4) from the tread surface 2S of the circumferential main grooves 3, there are applicable a groove width and a groove depth on the same levels as those of circumferential main grooves 3 of conventional heavy duty tires. For example, the groove width Wt can be suitably selected from a range of 8 to 15 mm, and the groove depth H can be suitably selected from a range of 16 to 26 mm. In the present embodiment, the circumferential main grooves 3 extend in the circumferential direction with substantially a constant groove width Wt.

In particular, the inner circumferential main grooves 3*i* are formed into a deformed zigzag shape in which a straight base portion 10 extending linearly in the circumferential direction and a dogleg bend 11 that is axially inwardly bent in a dogleg shape, are alternately arranged. The outer circumferential main grooves 3*o* are formed into a zigzag shape in which a bend 12*a* that is axially inwardly bent in a dogleg shape and a bend 12*b* that is axially outwardly bent in a dogleg shape, are alternately arranged. The zigzag pitch length of the inner circumferential main grooves 3*i* and the zigzag pitch length of the outer circumferential main grooves 3*o* are substantially the same. The term "substantially the same" comprehends a change of pitch according to a variable pitching method, production error and so on.

Figure 2:
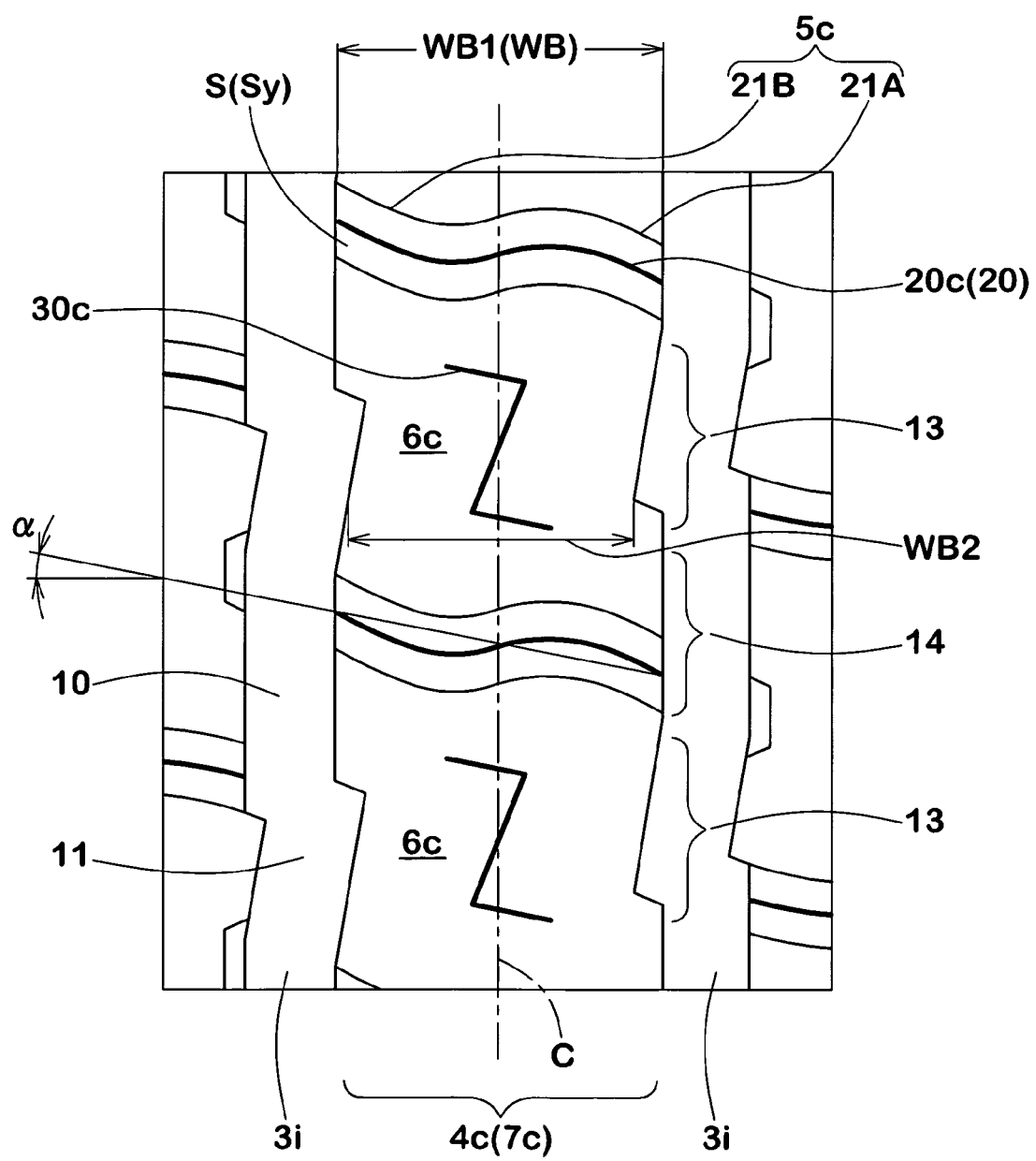
FIG. 2 is a plan view showing a rib-like land portion of center block row in an enlarged form.
Figure 3:
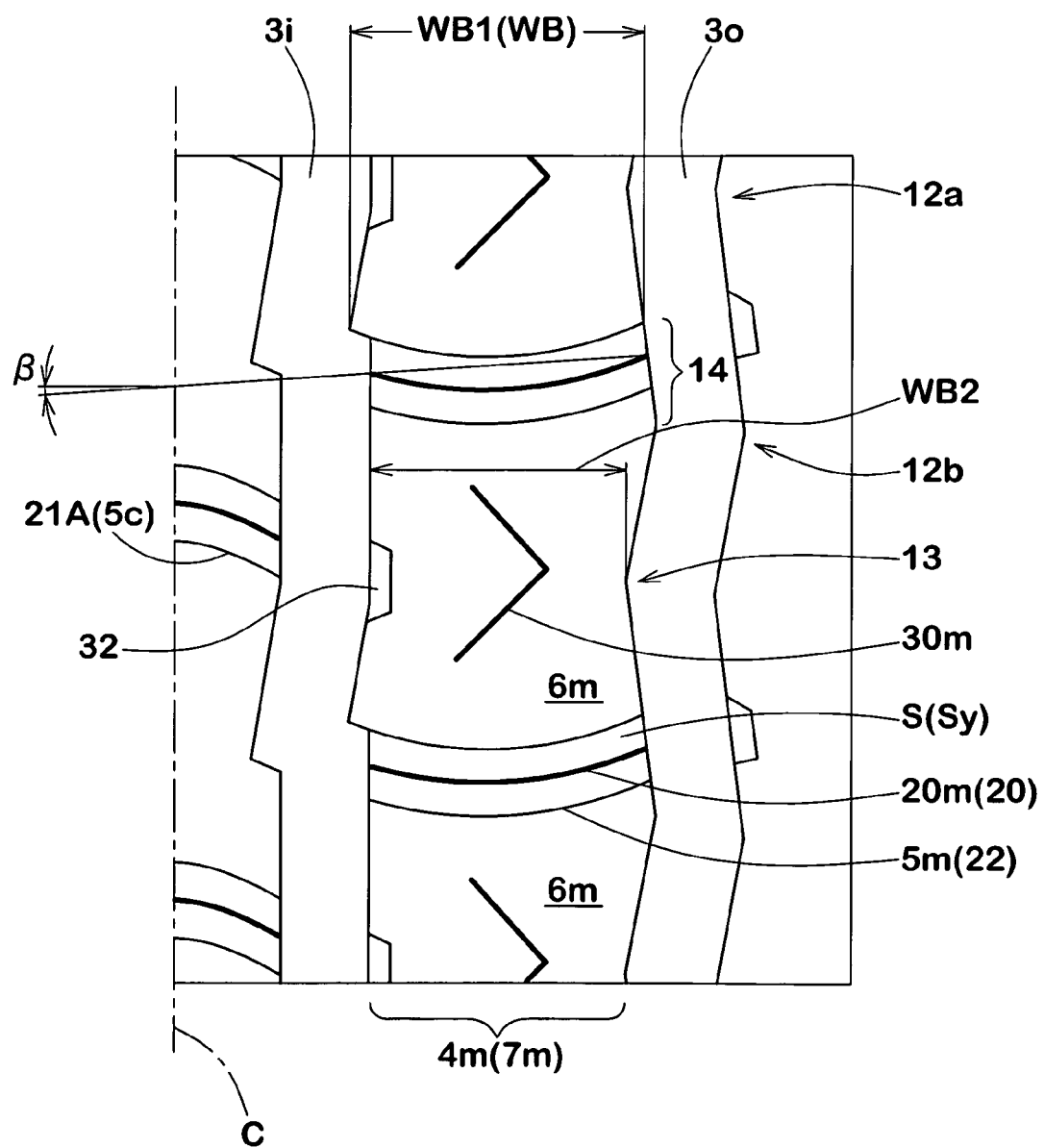
FIG. 3 is a plan view showing a rib-like land portion of middle block row in an enlarged form.

As a result that these circumferential main grooves 3*i* and 3*o* have zigzag shapes and their zigzag phases are shifted in the circumferential direction, the rib-like land portions 4*c* and 4*m* have such a shape that, as shown in FIGS. 2 and 3, a narrow part 13 at which the axial width becomes minimum and a projecting part 14 at which the axial width becomes maximum are alternately repeated.

The above-mentioned lateral grooves 5*c* and 5*m* are formed at the projecting parts 14, thereby providing blocks 6*c* and 6*m* having a calabash-like shape such that each block has the minimum block width WB2 at the narrow part 13 located at the center in the circumferential direction and the block width WB increases from the narrow part 13 toward the circumferential both edges. These blocks have the maximum width WB1 at one circumferential edge. Since the both circumferential edges of a block are free edges, the both edge portions are easy to move and have a low rigidity as compared with the circumferential center portion. It is possible to make up for a shortage of the rigidity by adopting the calabash-like block shape and, therefore, the rigidity can be uniformized in the circumferential direction. The WB1/WB2 ratio of the maximum block width WB1 to the minimum block width WB2 is preferably from 1.05 to 1.30.

The lateral grooves 5*c* and 5*m* are provided in their bottoms S with sipe-forming regions Sy having sipes 20*c* and 20*m* (sipes 20 when named generically) which extend along the groove center line. The sipes 20 have a width of 0.5 to 2.0 mm.

In FIGS. 1 to 4 is shown an embodiment in which the sipe-forming region Sy is provided in the whole area of the groove bottom S. That is to say, in this embodiment, sipe 20 is formed in the groove bottom S over the entire length of the groove bottom S.

If the block rigidity is set high from the viewpoint of ensuring the traction, stress of the abrasion energy becomes high and accordingly the heel and toe wear is easy to occur. However, when sipes 20 are formed in the groove bottoms S, the blocks 6 are easy to move in the circumferential direction by the sipe width. As a result, the stress of the abrasion energy can be decreased to improve the heel and toe wear performance. When a large external force is applied, the sipes 20 will close to restrain the movement of the blocks 6 and, therefore, a high block rigidity can be exhibited and the traction performance can be maintained high. If the sipe width is less than 0.5 mm, the range that the block 6 can move is narrow, and the stress of the abrasion energy cannot be decreased. On the other hand, if the sipe width exceeds 2.0 mm, the block 6 excessively moves and the amount of slippage between a heel end portion and a road increases at the time of kicking the road. Therefore, the effect of improving the heel and toe wear performance cannot be achieved, though the stress of the abrasion energy is decreased.

Figure 4:
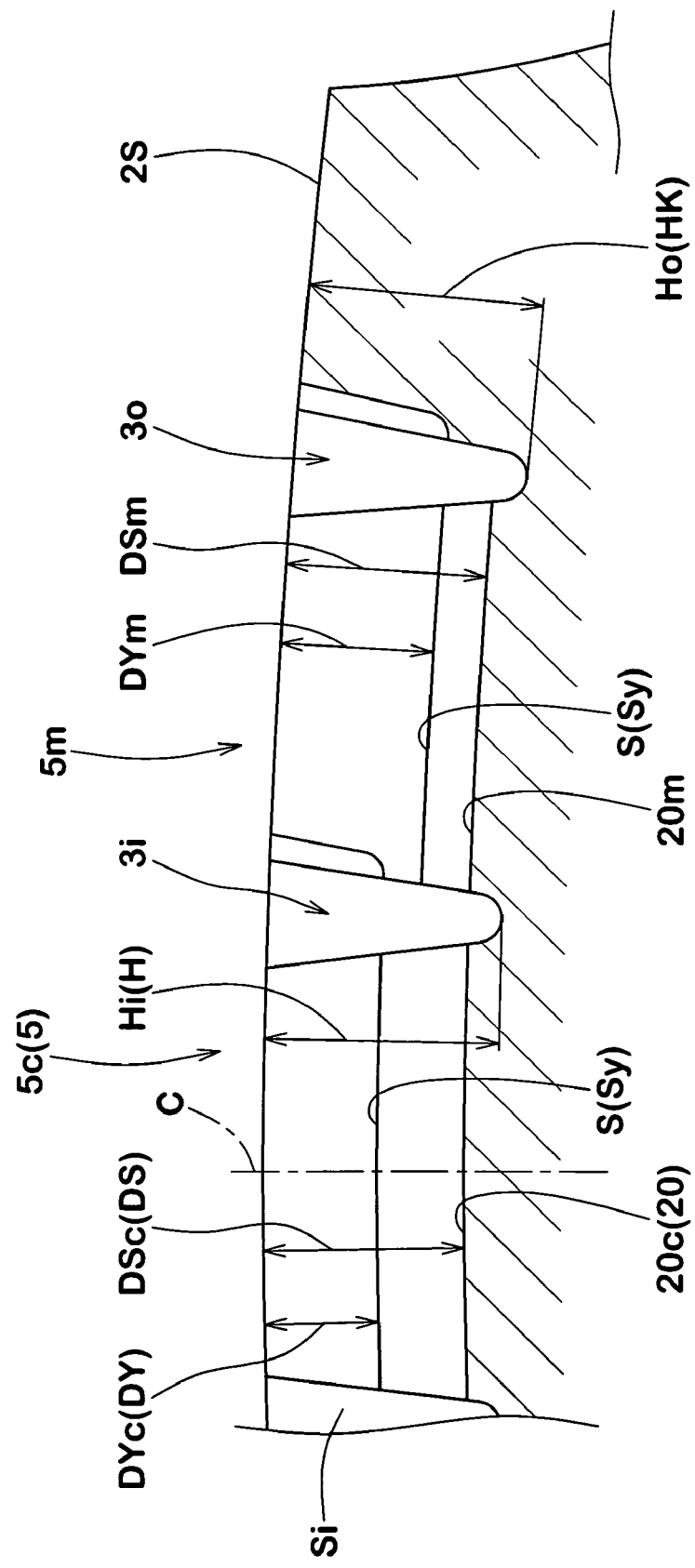
FIG. 4 is a cross sectional view showing a relationship between the depth of lateral grooves, the depth of circumferential main grooves and the depth of sipes.

It is required that the groove depth DY from the tread surface 2S in the sipe-forming region Sy of the lateral grooves 5, as shown in FIG. 4, is from 0.5 to 0.75 times the depth H from the tread surface 2S of the circumferential main grooves 3 that intersect with the lateral grooves 5, and that the depth DS from the tread surface of the sipes 20 is from 0.75 to 1.0 times the depth H of the circumferential main grooves. In the case that the depths H of the circumferential main grooves 3 which intersect with the lateral grooves 5 and are located on the both left and right sides are different from each other, the depth H of the shallower circumferential main groove is applied. In other words, the lateral groove depth DYc in the sipe-forming region Sy of the lateral grooves 5*c* is from 0.5 to 0.75 times the depth Hi of the circumferential main grooves 3*i* that intersect with the lateral grooves 5*c*, and that the depth DSc of the sipes 20*c* is from 0.75 to 1.0 times the depth Hi of the circumferential main grooves. Also, the lateral groove depth DYm in the sipe-forming region Sy of the lateral grooves 5*m* is from 0.5 to 0.75 times the depth HK of a shallower one of the depths Hi and Ho of the circumferential main grooves 3*i* and 3*o* that intersect with the lateral grooves 5*m*, and that the depth DSm of the sipes 20*m* is from 0.75 to 1.0 times the depth HK of the shallower circumferential main groove. In general, the depths Hi and Ho of the circumferential main grooves 3*i* and 3*o* are identical with each other.

The reasons why the lateral groove depth DY, the circumferential main groove depth H and the sipe depth DS are specified are as follows: If the DY/H ratio of the lateral groove depth DY to the circumferential main groove depth H is less than 0.5, the lateral grooves 5 disappear in the early stage of wear. If the DY/H ratio is more than 0.75, a sufficient sipe depth DS cannot be secured, so the effects of the present invention based on the sipes 20 cannot be sufficiently exhibited. Also, if the DS/H ratio of the sipe depth DS to the circumferential main groove depth H is less than 0.75, movement of the blocks 6 is impaired, so the effects of the present invention based on the sipes 20 cannot be sufficiently exhibited. If the DS/H ratio is more than 1.0, damage tends to occur from the sipe bottom.

In the present embodiment, in order to further enhance the traction performance, the lateral groove depth Dyc in the sipe-forming region Sy of the center lateral grooves 5c is made smaller than the lateral groove depth Dym in the sipe-forming region Sy of the middle lateral grooves 5m. The reason is that the traction performance can be more effectively enhanced by decreasing the lateral groove depth DY at the center rib-like land portion 4c at which the ground contact pressure becomes the highest, to thereby enhance the rigidity of blocks 6c. Increase in stress of abrasion energy caused by decreasing the lateral groove depth Dyc is suppressed by providing center sipes 20c. For this end, it is required that the sipe depth DSc of the center sipes 20c falls within the range of 85 to 115% of the sipe depth DSm of middle sipes 20m. If it is less than 85%, heel and toe wear tends to occur at the center blocks 6c, and if it is more than 115%, the rigidity of the center blocks 6c is decreased, so improvement in traction performance cannot be expected.

In the present invention, as shown in FIGS. 2 and 3, the center lateral groove 5c is formed into a smooth S-shaped curve comprised of a combination of a first arc portion 21A having the center on one side in the circumferential direction of tire and a second arc portion 21B having the center on the other side in the circumferential direction. Also, the middle lateral groove 5m is formed into a U-shaped curve comprised of a single arc portion 22, in which the direction of arc 22 is reversed to that of the arc portion 21A or 21B adjacent to this middle lateral groove 5m.

Like this, by forming the center lateral grooves 5c into an S-shaped curve and forming the middle lateral grooves 5m into a U-shaped curve and by alternating the arc centers thereof, there can be obtained the advantages that the traction performance can be uniformly exhibited, and local opening and closing of sipes 20 can be uniformized to disperse a stress when a twisting force is applied to a tire. The radius of curvature of the arc portions 21A and 21B is within the range of 35 to 60% of the maximum block width WB1 of the blocks 6c. The radius of curvature of the arc portion 22 is within the range of 80 to 120% of the maximum block width WB1 of the blocks 6m.

As a matter of course, the center sipes 20c are in an S shape extending along the center line of the center lateral grooves 5c, and the middle sipes 20m are in a circular arc shape extending along the center line of the middle lateral grooves 5m. From the viewpoint that the sipes open and close in the circumferential direction to reduce the stress of the abrasion energy, it is preferable that the sipes 20c and 20m are disposed such that the angle α or β of a straight line connecting the both ends of each sipe is 25° or less with respect to the axial direction of tire.

In the present embodiment, in order to enhance the traction performance, sipes 30c and 30m having a bent portion are formed in circumferentially center portions of the blocks 6c and 6m, respectively. In the present invention, the sipes 30c are in an approximately Z shape, and the sipes 30m are in a dogleg shape, whereby the edge effect is enhanced to improve the traction performance while maintaining the block rigidity.

The middle block 6m is provided with a square dent 32 in the narrow part 13 at an axially inner edge of the block, whereby the edge effect is enhanced while maintaining a balance of the rigidity in the block.

Figure 5:
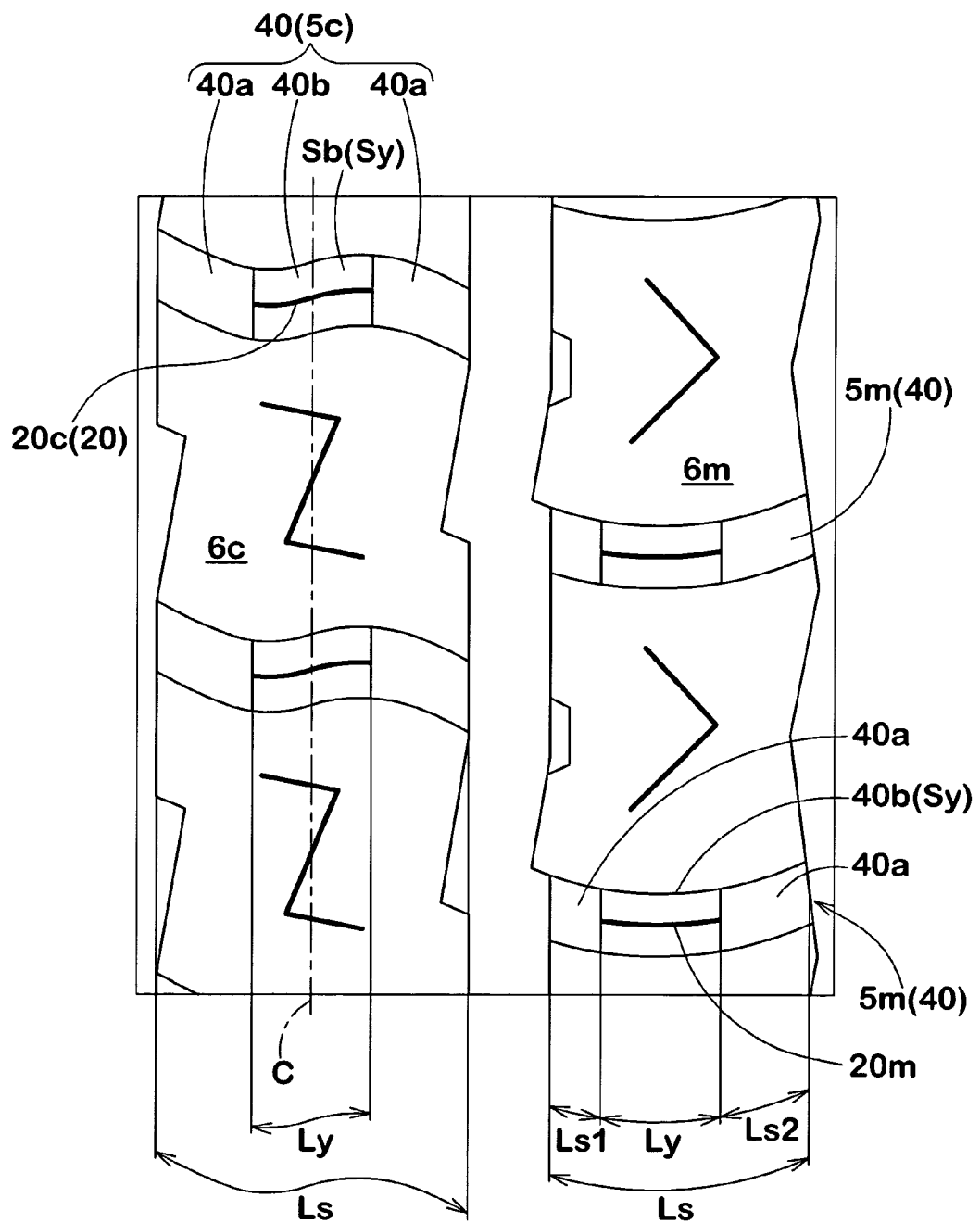
FIG. 5 is a plan view showing the rib-like land portion of center block row and the rib-like land portion of middle block row in an enlarged manner.
Figure 6:
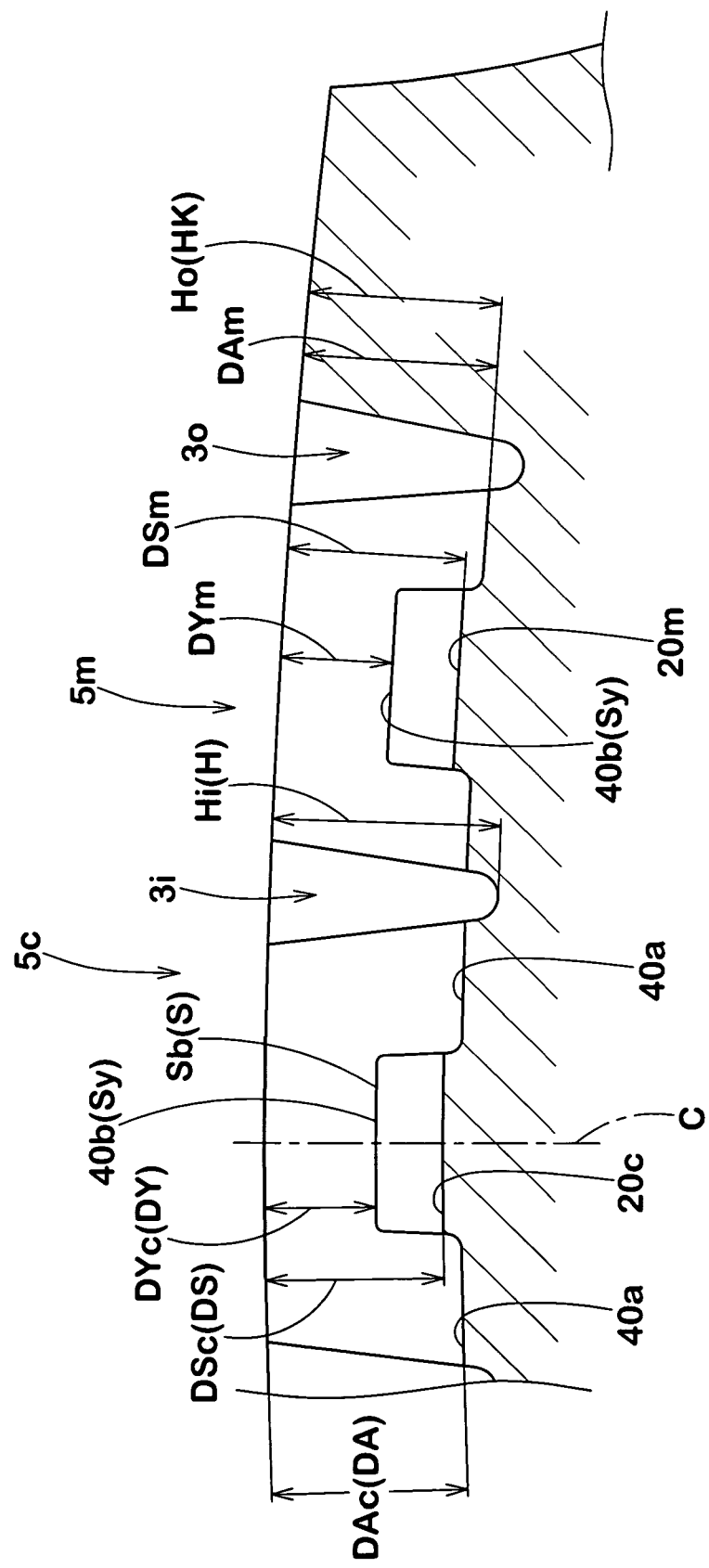
FIG. 6 is a cross sectional view showing a relationship between the depth of lateral grooves, the depth of circumferential main grooves and the depth of sipes.

In FIGS. 5 and 6 is shown an embodiment where the sipe-forming region Sy is disposed in a part of the groove bottom S of the lateral grooves 5c and 5m. In this embodiment is illustrated a case where the lateral grooves 5c and 5m are step grooves 40 comprising a deep part 40a at which the lateral groove depth D is large, and a shallow part 40b at which the lateral groove depth D is small and, in particular, deep parts 40a are disposed on the both sides of a shallow part 40b. A sipe 20 is formed in the groove bottom Sb of the shallow part 40b over the entire length of the groove bottom Sb. That is to say, the entire area of the groove bottom Sb of the shallow part 40b is the sipe-forming region Sy.

In such a case, too, the lateral groove depth DY at the shallow part 40b, namely the lateral groove depth DY in the sipe-forming region Sy, is from 0.5 to 0.75 times the depth H of a circumferential main groove 3 that intersects with the lateral grooves 5, and the depth DS of the sipes 20 is from 0.75 to 1.0 times the depth H of the circumferential main groove 3. In this case, the sipe depth DS is not more than the lateral groove depth DA at the deep part 40a of the lateral groove 5, and the lateral groove depth DA is not more than the depth H of the circumferential main groove. That is to say, there is a relationship of DS≦DA≦H.

Specifically, lateral groove depth DYc in the sipe-forming region Sy (i.e., shallow part 40b) of the lateral grooves 5c is set to a range of 0.5 to 0.75 times the depth Hi of the circumferential main grooves 3i which intersect with the lateral grooves 5c, and sipe depth DSc of the sipes 20c is set to a range of 0.75 to 1.0 times the depth Hi of the circumferential main grooves. Also, lateral groove depth DYm in the sipe-forming region Sy (i.e., shallow part 40b) of the lateral grooves 5m is set to a range of 0.5 to 0.75 times the depth HK of a shallower one of the depths Hi and Ho of the circumferential main grooves 3i and 3o that intersect with the lateral grooves 5m, and sipe depth DSm of the sipes 20m is set to a range of 0.75 to 1.0 times the depth HK of the shallower circumferential main groove. The sipe depths DSc and DSm are not more than the lateral groove depths DAc and DAm at the deep parts 40a of the lateral grooves 5c and 5m, and the lateral groove depth DAc and DAm are not more than the depths Hi and HK of the circumferential main grooves. That is to say, there are relationships of DSc≦DAc≦Hi and DSm≦DAm≦HK.

Length Ly of the sipe-forming region Sy measured along the groove center line is preferably 20% or more of the entire length Ls of the groove bottom S measured along the groove center line. If the length Ly is too small, the traction performance is improved, but the heel and toe wear resistance is noticeably deteriorated. As to the middle lateral grooves 5m, it is preferable that, as shown in FIG. 5, length LS1 of a deep part 40a1 located on the equator C side of the sipe-forming region Sy, measured along the groove center line, is smaller than length LS2 of a deep part 40a2 located on the tread edge Te side measured along the groove center line. The reason is that movement of blocks 6 can be more effectively suppressed by forming the sipe formation region Sy so as to be biased toward the tire equator C side at which the ground contact pressure is higher. If the length LS1 is too small, in other words, if the sipe-forming region Sy leans to the tire equator side excessively, movement of blocks 6 becomes relatively large on the tread edge Te side and it is disadvantage for the heel and toe wear resistance. Therefore, it is preferable that the length LS1 is 10% or more of the overall length Ls.

A particularly preferable embodiment of the present invention has been described, but the present invention can be modified to various embodiments and practiced without being limited to the embodiment shown in the drawings.

EXAMPLES

Heavy duty tires having a size of 11R22.5 and a basic pattern shown in FIG. 1 were manufactured based on the specifications shown in Tables 1 and 2, and the traction performance and heel/toe wear resistance of the tires were tested. Example 8 shows a case where blocks have no narrow part and the block width is constant. Examples 9 and 13 show a case where the lateral groove depth DYc in the sipe-forming region of the center lateral grooves 5c is smaller than the lateral groove depth DYm in the sipe-forming region of the middle lateral grooves 5m.

(1) Traction Performance

The tires were attached to wheels of a vehicle (2-DD car) under conditions of rim 8.25×22.5 and inner pressure 750 Kpa. The vehicle was run on a basalt tile road of a test course. The time required for running 20 m when the vehicle was run from a third speed idling state by full acceleration was measured. The results are shown by an index based on the result of Example 2 regarded as 100. The larger the value, the better.

(2) Heel/Toe Wear Resistance

The same vehicle as above was run 40,000 km, and the amounts of heel/toe wear in respective block rows were measured. The results are shown by an index based on the result of Example 2 regarded as 100. The larger the value, the better.

TABLE 2

|  | Ex. 10 | Ex. 11 | Ex. 12 | Ex. 13 |
|---|---|---|---|---|
| Center block row |  |  |  |  |
| Maximum block width WB1 (mm) | 40 | 40 | 40 | 40 |
| Minimum block width WB2 (mm) | 35 | 35 | 35 | 35 |
| WB1/WB2 ratio | 1.14 | 1.14 | 1.14 | 1.14 |
| Configuration of sipe-forming region | FIG. 6 | FIG. 6 | FIG. 6 | FIG. 6 |
| Ly/Ls ratio | 0.50 | 0.35 | 0.10 | 0.35 |
| Lateral groove depth DYc (mm) | 15.6 | 15.6 | 15.6 | 12.0 |
| Sipe in groove bottom |  |  |  |  |
| Sipe depth DSc (mm) | 22 | 22 | 22 | 22 |
| Sipe width (mm) | 1.0 | 1.0 | 1.0 | 1.0 |
| DYc/H ratio | 0.65 | 0.65 | 0.65 | 0.5 |
| DSc/H ratio | 0.9 | 0.9 | 0.9 | 0.9 |
| Middle block row |  |  |  |  |
| Maximum block width WB1 (mm) | 40 | 40 | 40 | 40 |
| Minimum block width WB2 (mm) | 35 | 35 | 35 | 35 |
| WB1/WB2 ratio | 1.14 | 1.14 | 1.14 | 1.14 |
| Configuration of sipe-forming region | FIG. 6 | FIG. 6 | FIG. 6 | FIG. 6 |
| Ly/Ls ratio | 0.50 | 0.35 | 0.10 | 0.35 |
| Lateral groove depth DYm (mm) | 15.6 | 15.6 | 15.6 | 15.6 |
| Sipe in groove bottom |  |  |  |  |
| Sipe depth DSm (mm) | 22 | 22 | 22 | 22 |
| Sipe width (mm) | 1.0 | 1.0 | 1.0 | 1.0 |
| DYm/H ratio | 0.65 | 0.65 | 0.65 | 0.65 |
| DSm/H ratio | 0.9 | 0.9 | 0.9 | 0.9 |
| DYc/DYm ratio | 1.0 | 1.0 | 1.0 | 0.77 |
| Traction performance | 103 | 104 | 107 | 106 |

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Center block row |  |  |  |  |  |  |  |  |  |
| Maximum block width WB1 (mm) | 40 | 40 | 40 | 40 | 40 | 40 | 40 | 40 | 40 |
| Minimum block width WB2 (mm) | 35 | 35 | 35 | 35 | 35 | 35 | 35 | 40 | 35 |
| WB1/WB2 ratio | 1.14 | 1.14 | 1.14 | 1.14 | 1.14 | 1.14 | 1.14 | 1.0 | 1.14 |
| Configuration of sipe-forming region | FIG. 4 | FIG. 4 | FIG. 4 | FIG. 4 | FIG. 4 | FIG. 4 | FIG. 4 | FIG. 4 | FIG. 4 |
| Ly/Ls ratio | 1.0 | 1.0 | 1.0 | 1.0 | 1.0 | 1.0 | 1.0 | 1.0 | 1.0 |
| Lateral groove depth DYc (mm) | 12.0 | 15.6 | 18.0 | 15.6 | 15.6 | 15.6 | 15.6 | 15.6 | 12.0 |
| Sipe in groove bottom |  |  |  |  |  |  |  |  |  |
| Sipe depth DSc (mm) | 22 | 22 | 22 | 18 | 24 | 22 | 22 | 22 | 22 |
| Sipe width (mm) | 1.0 | 1.0 | 1.0 | 1.0 | 1.0 | 0.5 | 2.0 | 1.0 | 1.0 |
| DYc/H ratio | 0.5 | 0.65 | 0.75 | 0.65 | 0.65 | 0.65 | 0.65 | 0.65 | 0.5 |
| DSc/H ratio | 0.9 | 0.9 | 0.9 | 0.75 | 1.0 | 0.9 | 0.9 | 0.9 | 0.9 |
| Middle block row |  |  |  |  |  |  |  |  |  |
| Maximum block width WB1 (mm) | 40 | 40 | 40 | 40 | 40 | 40 | 40 | 40 | 40 |
| Minimum block width WB2 (mm) | 35 | 35 | 35 | 35 | 35 | 35 | 35 | 40 | 35 |
| WB1/WB2 ratio | 1.14 | 1.14 | 1.14 | 1.14 | 1.14 | 1.14 | 1.14 | 1 | 1.14 |
| Configuration of sipe-forming region | FIG. 4 | FIG. 4 | FIG. 4 | FIG. 4 | FIG. 4 | FIG. 4 | FIG. 4 | FIG. 4 | FIG. 4 |
| Ly/Ls ratio | 1.0 | 1.0 | 1.0 | 1.0 | 1.0 | 1.0 | 1.0 | 1.0 | 1.0 |
| Lateral groove depth DYm (mm) | 12.0 | 15.6 | 18.0 | 15.6 | 15.6 | 15.6 | 15.6 | 15.6 | 15.6 |
| Sipe in groove bottom |  |  |  |  |  |  |  |  |  |
| Sipe depth DSm (mm) | 22 | 22 | 22 | 18 | 24 | 22 | 22 | 22 | 22 |
| Sipe width (mm) | 1.0 | 1.0 | 1.0 | 1.0 | 1.0 | 0.5 | 2.0 | 1.0 | 1.0 |
| DYm/H ratio | 0.5 | 0.65 | 0.75 | 0.65 | 0.65 | 0.65 | 0.65 | 0.65 | 0.65 |
| DSm/H ratio | 0.9 | 0.9 | 0.9 | 0.75 | 1.0 | 0.9 | 0.9 | 0.9 | 0.9 |
| DYc/DYm ratio | 1.0 | 1.0 | 1.0 | 1.0 | 1.0 | 1.0 | 1.0 | 1.0 | 0.77 |
| Traction performance | 95 | 100 | 108 | 100 | 101 | 98 | 102 | 92 | 102 |
| Heel/toe wear resistance |  |  |  |  |  |  |  |  |  |
| Center block row | 106 | 100 | 93 | 97 | 99 | 92 | 98 | 96 | 101 |
| Middle block row | 105 | 100 | 93 | 98 | 98 | 92 | 99 | 96 | 100 |

\* H is 24 mm and is constant.

TABLE 2-continued

|  | Ex. 10 | Ex. 11 | Ex. 12 | Ex. 13 |
|---|---|---|---|---|
| Heel/toe wear resistance | | | | |
| Center block row | 99 | 99 | 94 | 99 |
| Middle block row | 99 | 99 | 93 | 98 |

* H is 24 mm and is constant.

What is claimed is:

1. A heavy duty tire comprising
a tread portion provided in the tread surface with a plurality of circumferential main grooves extending in the circumferential direction to provide rib-like land portions between the adjacent circumferential main grooves and between tread edges and the circumferential main grooves, wherein
at least three of the rib-like land portions each has a row of blocks arranged in the circumferential direction formed by lateral grooves crossing each said rib-like land portion,
each said lateral groove is provided in its bottom with a sipe-forming region having a sipe which extends along the groove center line of the lateral groove and has a width of 0.5 to 2.0 mm,
a depth DY of the lateral groove measured from the tread surface to the sipe-forming region is from 0.5 to 0.75 times a depth H from the tread surface of the circumferential main grooves that intersect with the lateral groove,
a depth DS from the tread surface of the sipe is from 0.75 to 1.0 times the depth H of the circumferential main grooves,
said at least three rib-like land portions each having a row of the blocks include a center block row rib-like land portion disposed on the tire equator and
a side block row rib-like land portion disposed on each side of said center block row rib-like land portion,
the lateral grooves disposed in said center block row rib-like land portion have an S shape comprising a first arc portion having its center on one side in the circumferential direction of tire and a second arc portion having its center on the other side in the circumferential direction,
the lateral grooves disposed in said side block row rib-like land portion each have a U shape comprising a single arc portion having its center on said one side or said other side in the circumferential direction, and
the U-shaped arc portions of said lateral grooves are oriented in the reverse direction to said first arc portion or second arc portion adjacent thereto with the circumferential main groove lying therebetween.

2. The heavy duty tire of claim 1, wherein
each said lateral groove has said sipe-forming region in the entire region of the groove bottom.

3. The heavy duty tire of claim 1, wherein
each of said lateral grooves is a step groove comprising a deep part having a larger depth and a shallow part having a smaller depth and has said sipe-forming region in the entire region of the groove bottom of said shallow part.

4. The heavy duty tire of claim 1, wherein said at least three rib-like land portions having a row of blocks have such a shape that narrow parts at which the axial width becomes minimum and projecting parts at which the axial width becomes maximum are alternately disposed, and said lateral grooves are provided in said projecting parts.

5. The heavy duty tire of claim 1, wherein
the lateral groove depth $DY_c$ in the sipe-forming region of the lateral grooves disposed in said center block row rib-like land portion is smaller than the lateral groove depth $DY_m$ in the sipe-forming region of the lateral grooves disposed in said side block row rib-like land portions.

6. The heavy duty tire of claim 5, wherein the sipe depth $DS_c$ of the sipes formed in the lateral grooves disposed in said center block row rib-like land portion is within a range of from 85 to 115% of the sipe depth $DS_m$ of the sipes formed in the lateral grooves disposed in said side block row rib-like land portions.

7. The heavy duty tire of claim 1, wherein
radii of curvature of said first and second arc portions of the S-shaped lateral grooves are within a range of from 35 to 60% of a maximum block width of the blocks of said center block row rib-like land portion, and
a radius of curvature of said arc portion of the U-shaped lateral grooves is within a range of from 80 to 120% of a maximum block width of the blocks of said side block row rib-like land portions.

8. The heavy duty tire of claim 2, wherein said at least three rib-like land portions having a row of blocks have such a shape that narrow parts at which the axial width becomes minimum and projecting parts at which the axial width becomes maximum are alternately disposed, and said lateral grooves are provided in said projecting parts.

9. The heavy duty tire of claim 3, wherein
each of said at least three rib-like land portions having a row of the blocks has such a shape that narrow parts at which the axial width becomes minimum and projecting parts at which the axial width becomes maximum are alternately disposed, and
said lateral grooves are provided in said projecting parts.

* * * * *